United States Patent [19]

Grey, Jr.

[11] Patent Number: 4,500,114
[45] Date of Patent: Feb. 19, 1985

[54] DEVICE FOR CONTROLLED DIFFERENTIAL FLOW

[75] Inventor: James T. Grey, Jr., Yardley, Pa.

[73] Assignee: Thiokol Corporation, Chicago, Ill.

[21] Appl. No.: 412,339

[22] Filed: Aug. 27, 1982

[51] Int. Cl.³ .............................................. B60R 21/08
[52] U.S. Cl. .................................. 280/742; 280/731; 280/738
[58] Field of Search ............... 280/738, 729, 730, 736, 280/739, 740, 742, 741, 728, 731; 428/90, 91

[56] References Cited

U.S. PATENT DOCUMENTS

| 3,511,519 | 5/1970 | Martin | 280/739 |
| 3,791,669 | 2/1974 | Hamilton | 280/738 |
| 3,909,037 | 9/1975 | Stewart | 280/738 |
| 4,043,572 | 8/1977 | Hattori et al. | 280/738 |
| 4,076,277 | 2/1978 | Kuwakado et al. | 280/738 |
| 4,145,467 | 3/1979 | Malik | 428/91 |

Primary Examiner—Richard A. Bertsch
Attorney, Agent, or Firm—Gerald K. White; Edward E. McCullough; Thomas W. Brennan

[57] ABSTRACT

A flow control device for use with inflatable confinements or "air bags" of vehicle occupant safety restraint systems is produced by incorporating in the wall of the confinement a fluid permeable portion which has a filamentous surface on one side in which flexible, filamentary projections align themselves in parallel relation as fluid permeates the portion and flows into the bag relatively unrestrictedly, and collapse against the surface as fluid permeates the portion and flows out of the bag relatively more restrictedly to provide rebound protection for the vehicle occupant.

21 Claims, 6 Drawing Figures

DEVICE FOR CONTROLLED DIFFERENTIAL FLOW

BACKGROUND OF THE INVENTION

1. Field of the Invention

This invention relates to inflatable devices of the type which are inflated wholly or in part by fluid pressure, for protectively restraining the movement of an occupant relative to a vehicle when the vehicle becomes involved in a collision. More particularly, this invention relates to inflatable confinements of these devices in which differential fluid flow control into and out of the confinement is provided for to eliminate or mitigate in some significant way rebound injury to the occupant under the stated conditions.

2. Description of the Prior Art

Inflatable confinements, i.e., air bags, flexible containers, or cushions for restraining the movement of vehicle occupants during collisions have long been known. In addition, it is also known to provide inflation means such as gas generators and the like to supply primary inflating fluid or gas in which the action of the bag in the process of being inflated is utilized to aspirate ambient air into the bag thereby minimizing the requirement for primary inflating fluid. Furthermore, it is also well known to incorporate additional safety means into the restraint system to prevent rebound injury to the occupant. For example, in U.S. Pat. No. 3,527,475, blowout patches incorporated in an air bag wall give way under the increased pressure experienced by the inflated air bag when impacted by the occupant being restrained during the collision. In U.S. Pat. No. 3,511,519, perforations in a portion of the bag wall permit passage of inflation fluid out of the bag upon occupant impact to deflate the bag and minimize rebound of the occupant therefrom. U.S. Pat. No. 3,758,133 on the other hand, utilizes a valve in the system operative to open when the interior pressure of the bag increases upon occupant impact to permit passage of inflation fluid out of the bag to deflate the bag. Other patents disclosing similar safety devices, also, with some minor variations, representative of the prior art of rebound protection for vehicle occupants during collisions are: U.S. Pat. Nos. 3,762,741, 3,784,225, 3,792,873, 3,799,574, 3,807,754, 3,990,726, 3,991,249 and 4,043,572.

Prior art patents disclosing restraint systems representative of inflatable restraints in which ambient air is aspirated into a confinement to inflate it are the following: U.S. Pat. No. 3,733,091 in which restraint cushions are inflated both by pressure fluid from a primary on-board source of supply and ambient air aspirated through an ambient air receiving chamber defined by movable frontal and base portions of the air bag; U.S. Pat. No. 3,767,225, which utilizes a flutter valve in the bag through which ambient air is aspirated by action of the bag as it is inflated with gas from a primary pressure source; U.S. Pat. No. 3,791,669, which discloses a diffuser-aspirator arrangement to augment inflation rate of an air bag by means of a conical inlet to facilitate entry of the aspirated air thereinto; U.S. Pat. No. 3,938,826, in which pressurized primary gas or fluid from a gas generator is used to aspirate ambient air into the bag, the primary gas and ambient air being mixed therein to inflate the bag; U.S. Pat. No. 4,043,572, previously mentioned, in which pressure fluid from a primary pressure source is used to induce ambient air flow into the bag through uncoverable ports provided; U.S. Pat. No. 4,076,277 in which an inner gas column or tubular air bag is inflated by a gas generating source and air is sucked into an outer bag by action of the inflating columns or tubes; and finally, within the present applicant's personal knowledge is a proposal for an emergency dual chamber crash cushion consisting of an inner, pre-shaped tube which serves as an inflatable structural frame supporting another outer chamber. However, in none of the aforementioned is it suggested, or in any way even remotely taught to make confinements with flexible, fluid impermeable walls for inflatable restraints to protect vehicle occupants during collisions which incorporate fluid permeable portions in the walls of the confinements having a filamentous surface to permit controlled, differential flow of inflated fluid into and out of the confinement restraining the movement of the occupant relative to the vehicle while eliminating, or mitigating injury from rebound as a result.

SUMMARY OF THE INVENTION

Accordingly, it is an object of the present invention to provide an improved flow control device for use in inflatable vehicle occupant restraint systems which is of simple, inexpensive construction, compact and suitable for use with even very small vehicles.

Another object of the invention is to provide a device of the character described which is useful in an aspirated air inflatable confinement of a vehicle occupant restraint system by allowing fluid to flow into the confinement relatively without restriction to rapidly inflate the same and restrain the vehicle occupant while permitting flow out of the confinement relatively more restrictedly, slowly deflating the confinement and providing rebound protection therefor.

A further object of the invention is to provide fluid flow control for an inflatable confinement of a vehicle occupant restraint system of the character referred to which is in the form of a fluid permeable portion of the confinement, such as a part of the wall thereof, having a filamentous surface of flexible, extensile filamentary elements or projections on one side thereof anchored to the surface on one of its ends with free, opposite ends extendible by action of the fluid passing through the permeable wall part and into the confinement relatively unrestrictedly, and, the filamentary elements being collapsible onto the surface by action of the fluid passing out of the confinement relatively more restrictedly upon impact by the occupant to provide protection against injury due to rebound of the vehicle occupant.

These and other objects will become apparent with reference to the following detailed description and are accomplished by the provision of an improvement to the art of vehicle occupant restraint systems of the type including a confinement or "air bag" adapted to be inflated by direct injection of primary gas from a vehicle stored source of supply to an inner, folded and collapsed confinement which erects an outer, folded and collapsed confinement as it inflates and which includes in its foldable wall, an aspiration device to permit ambient air from the vehicle interior to flow into the outer confinement thereby inflating it, the aspiration device being fabricated as a fluid permeable portion of the confinement wall with a filamentous surface on one side thereof.

DESCRIPTION OF THE PREFERRED EMBODIMENTS

Figure 1:
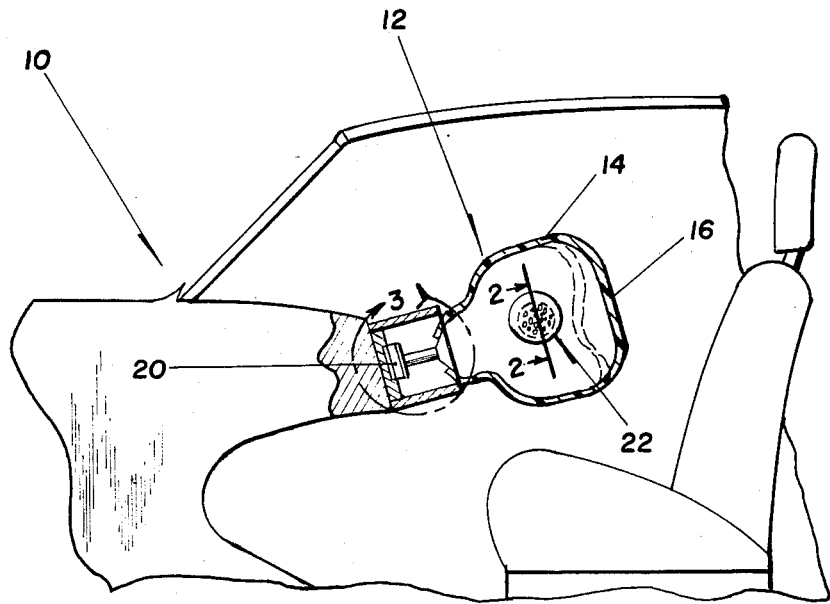
FIG. 1 is an illustration, partially schematic and partially sectioned, of an automotive vehicle showing one embodiment of the invention used in an inflatable confinement or air bag with the latter deployed in an unfolded, expanded condition for restraining a vehicle occupant.
Figures 2, 3:
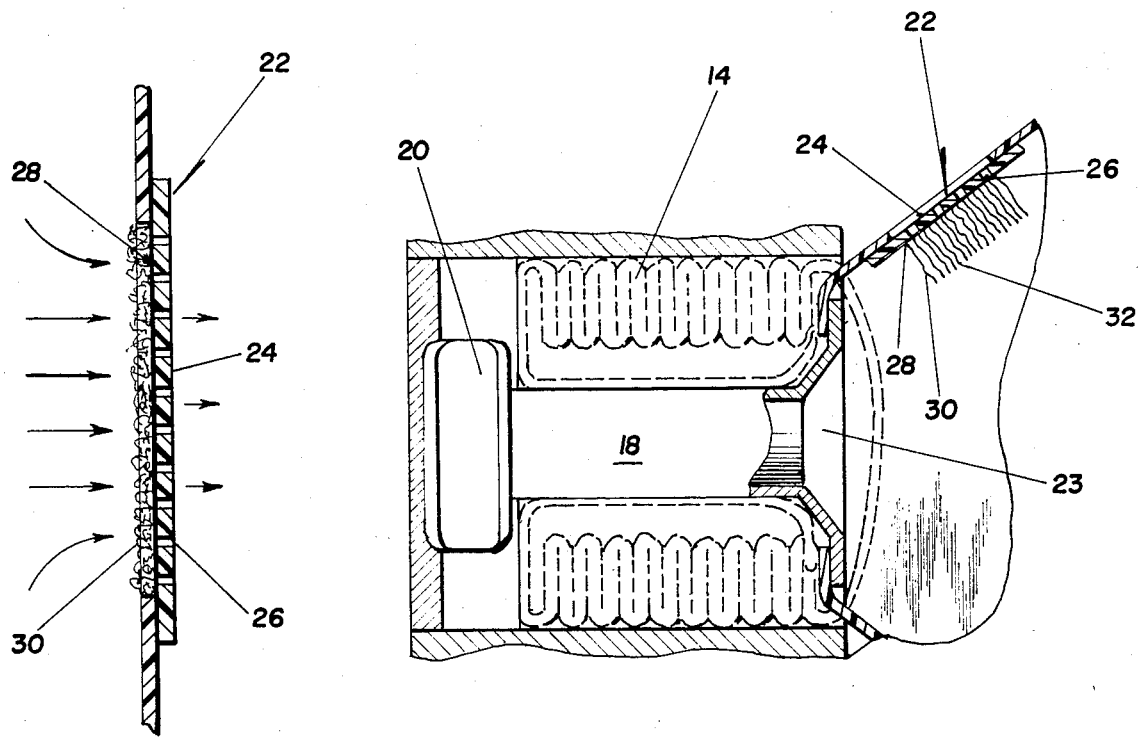
FIG. 2 is a sectional view taken along line 2—2 of FIG. 1.
FIG. 3 is an enlarged, sectional view of that portion of FIG. 1 within the circle 3.

In the drawing of FIG. 1, a vehicle 10 is equipped with a safety restraint system 12 comprising, as best seen in FIG. 3, a foldable, expansible structure or confinement in the form of an inflatable cushion or air bag 14, formed with a continuous, flexible, fluid impermeable wall 16. Confinement 14 communicates with a supply conduit 18 which conducts inflation gas from an inflator device, generalized in the drawings of FIGS. 1 and 3 as pyrotechnic gas generator 20.

As will be explained in more detail, confinement 14 has incorporated into a wall 26 thereof a panel device or fabric 22 providing controlled differential fluid flow into and out of confinement 14 during a collision involving vehicle 10 and during which confinement 14 is inflated and functioning to restrain, and thereby protect, the occupant thereof from injury.

Panel device or fabric 22, basically a textile fabric, comprises a base or scrim member 24 which, in the embodiment shown in FIG. 2, is a non-woven plastic sheet containing a large number of perforations or pores 26 to make it permeable to fluid passing into confinement 14. It is understood, however, that member 24 is not limited to the form shown in FIG. 2 but that it can have many other useful forms which will occur to the skilled person using the invention. For example, scrim 24 can be a woven article or fabric made with warp and filling yarns of plastic material, as will be indicated in the description of the embodiment of FIGS. 4-6. In addition, its manufacture need not be limited to plastics, although many synthetics such as the polyolefins, e.g. polyethylene, polypropylene and polybutylene, the polytetrafluoroethylenes, the polyesters, the polyimidazoles and the polyamides are particularly well suited to the purpose and are preferred. Thus, it will be apparent that, if desired, any porous material can be used including spun bonded sheets of material composed of non-woven, randomly dispersed overlapping and intersecting continuous synthetic filaments of polymeric materials as mentioned previously, either self-bonded or partially bonded with an externally added bonding agent. In finished form, such sheets are highly porous and will permit pass-through of fluid relatively without hindrance.

In addition to being a porous sheet, fabric 24 has, at least on one side, a filamentous surface 28 which is characterized by the presence of a multitude of flexible, extensile filaments, fibrils or filamentary projections 30 anchored at one end in or to scrim member 24 in surface 28 with their opposite ends 32 being free.

By "filamentous surface" is meant that surface 28 has a hairy or fuzzy appearance caused by the presence of a great profusion of filamentary elements 30 which may be finely divided fibrils ranging in size from microscopic cilia to something resembling human hair or slightly larger. Fibrils 30 are intended to be rather long, ranging from an inch in length to several inches long as might be found in a fur coat or other similar furry garment. Fibrils 30 are also intended to be flexible and sufficiently light in weight (low denier) to be capable of extension to their full lengths by the action of fluid flowing through fabric 22 and surface 28 and adaptable to arrange themselves perpendicularly thereto and in mutual parallel relation. Thus, it should also be readily apparent that impedance or restriction to flow of fluid in the direction through fabric 22, into and through surface 28 from the bottom thereof and lengthwise through fibrils 30 (i.e. into air bag 14), will be relatively low or insignificant. On the other hand, fluid flowing oppositely in a direction onto surface 28 and thence through panel 22 will be impeded by the collapsing of fibrils 30 onto surface 28; hence flow out of confinement 14 will be significantly more restricted and at a significantly reduced rate caused by the matted surface 28 formed by collapsed fibrils 30 thereupon which tend to block-up or otherwise clog the pores, openings or perforations 26 in panel 22. This effect is further illustrated in FIG. 3 wherein additional or second panel or fabric 22 is depicted incorporated into wall 16 of confinement 14 and functioning as an aspirator when positioned near the inlet 23 of confinement 24. Filamentous surface 28 faces inwardly and as confinement 14 is inflated with gas from generator 30, interior air of vehicle 10 is aspirated thereinto through perforations 26 in fabric 24 of panel device 22, the flowing air extending fibrils 30 outwardly from surface 28 as each fibril arranges itself in a perpendicular position with respect to surface 28 and parallel to an adjacent fibril 30 therein. Obviously, under these conditions, air flow into confinement 14 will be relatively unrestricted in contrast to flow out of confinement 14, as indicated in FIG. 2, which will be relatively more inhibited or restricted by the matted, collapsed fibrils 30 thereon.

Figure 4:
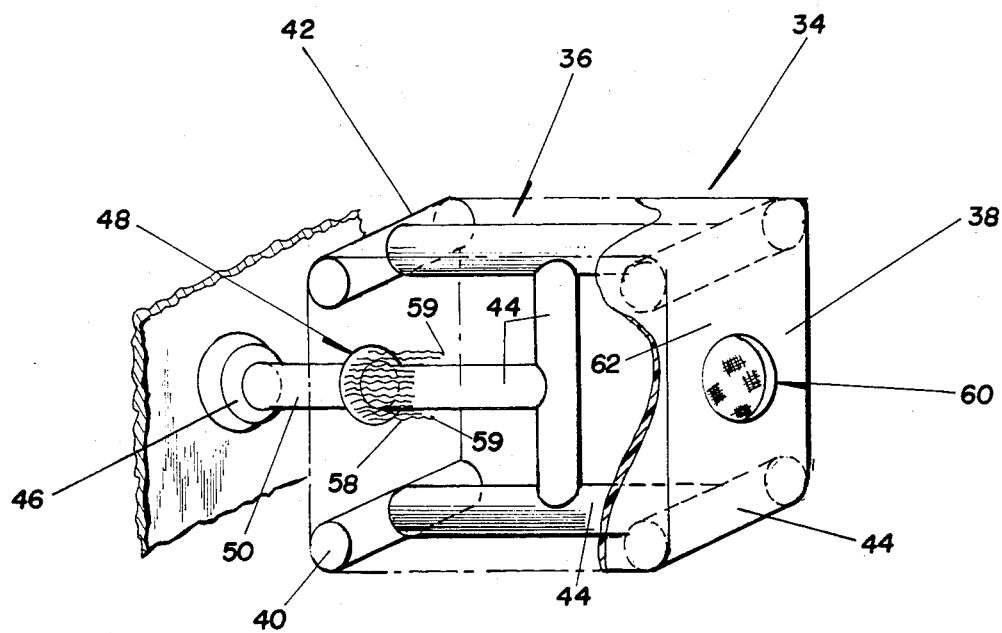
FIG. 4 is a pictorial view of a second embodiment of the invention, parts broken away.

Turning now to FIG. 4, a second or additional embodiment of the invention will be described wherein a flexible, inflatable restraint system 34 is shown in its inflated, expanded condition for protecting the occupants of a vehicle involved in a collision. Restraint system 34 has an inner confinement 36 and an outer confinement 38, both of which have flexible, foldable fluid impermeable walls 40 and 42 repectively, inner confinement 36 being enclosably contained within outer confinement 38 in fluid tight relation therewith, their respective interiors non-communicating. Inner confinement 36 is made up of a plurality of preshaped tubular members 44 each of which is sealingly connected with at least one other tubular member 44 and one of which is also connected to an inflating device, the gas generator 46.

Outer confinement 38 has an aspirating device 48, similar to fabric panel 22 in construction, incorporated in one of its walls 42 disposed annularly about the conduit 50 connecting gas generator 46 to a centrally positioned one of the tubular members 44. Aspirator 48, as mentioned previously, has been constructed generally according to flow control panel 22 and is incorporated into wall 42 in a similar way except in some minor respects. In this embodiment of the invention of aspirator device 48, a scrim or base fabric 52 is also employed and is also basically a textile fabric. In this case, however, base 52 is an open weave cloth or fabric of warp yarns 54 and fill yarns 56, best seen in FIG. 6, and has on one side a filamentous surface 57 similarly characterized by the presence of a plurality of filamentary projections or fibrils 58. Filaments or fibrils 58 are also anchored at one end to surface 57 in yarns 54 and 56 of fabric 52 with their opposite ends 59 being free. It will be appreciated, however, that filamentous surface 57 can as readily be contained in either warp yarns 54, fill yarns 56 or both, and can be formed either before or after weaving. For example, a process well known in the textile industry called "fibrillation" can be used to form low denier fibrils either in the woven fabric or in the individual yarns of the fabric before weaving to construct fabric 52 with filamentary projections 58 and filamentous surface 57 of the invention.

Figure 5:
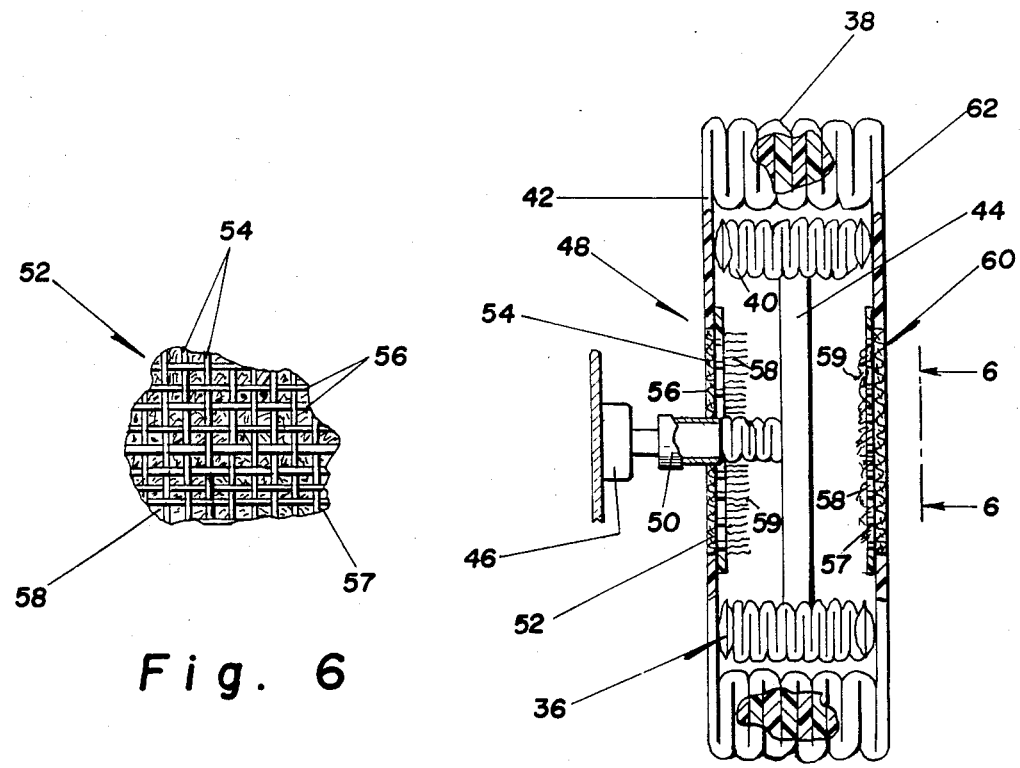
FIG. 5 is an elevational section of the embodiment of FIG. 4 showing the latter in its folded, uninflated condition.

In addition to aspirator 48, outer confinement 38 contains an additional differential flow control device 60 also similar in construction to fabric panel 22, identical to aspirator 48 and preferably located in an opposite, remotely located wall 62 thereof for rebound protection of an occupant of vehicle 10 during a collision. In FIG. 5, restraint system 34 is shown in its folded, uninflated condition indicating the relative, opposing positions of both aspirator 48 and fabric panel 60. What will be further appreciated from FIG. 5 is the practically identical constructions of these devices; each includes the same type of woven textile scrim or base fabric 52, the same filamentous surface 57 on one side thereof, the same fibrils or filamentary projections 58 anchored at one end to the same surface 57 and having the same free ends 59 adapted in the same way to be extended outwardly in parallel relation by action of fluid flowing into confinement 38, and collapsible onto surface 57 by fluid flowing oppositely, or out of bag or confinement 38, as would occur in a collision involving vehicle 10 upon impact thereupon by the occupant thereof. In addition, fluid flowing into confinement 38 does so, as before, relatively unhindered or without restriction in the direction tending to inflate confinement 38 and relatively more restrictively when flowing outwardly in the direction tending to deflate confinement 38.

In operation of the invention of the embodiments of FIGS. 1 through 3, simultaneously with inflation of confinement 14, when gas generator 20 is energized, the mixture of gas and (aspirated) air therein flows outwardly in a direction tending to deflate air bag 14 through second or additional flow control device 22 in wall 16. However, outward flow, as explained previously, will be at a much reduced rate ordinarily in the range of from a 50 to about a 90 percent reduction depending upon the density of filaments 30 in surface 28. Filamentous surface 28 facing inwardly in confinement 14 and the flow of inflation gas being outward, will result in filaments 30 collapsing onto surface 28 in a generally matted condition, tending to clog perforations 26, as shown in FIG. 2.

Figure 6:
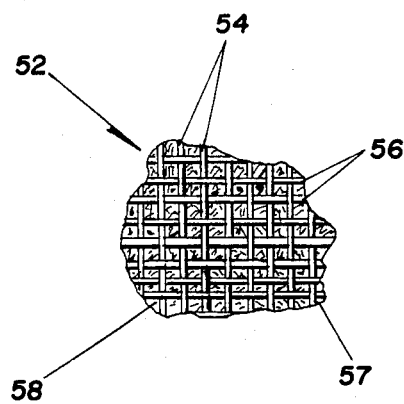
FIG. 6 is an enlarged view taken along 6—6 of FIG. 5.

In operation of the embodiment of the invention depicted in FIGS. 4 through 6, in a collision situation involving vehicle 10, gas generator 46 will be energized by sensor means (not shown) and inflation gas will be supplied to tubular confinement 36 erecting the same through inflation of tube members 44 thereof. As inner confinement 36 is erected by inflation, air from vehicle 10 interior enters outer confinement 38 by aspiration through annular aspirator 48, being aided in this by the tenancy of the expanding outer confinement 38 to cause an over-pressurization condition to occur in the interior of vehicle 10, which tendency toward over-pressurization is due to the reduction of volume inside vehicle 10 as confinement 38 attains full expansion and hence will be eliminated in the present invention. Simultaneously, air inside confinement 38 flows outwardly through differential flow control panel 60 in wall 62 and returns to the interior of vehicle 10 albeit, under restriction caused by the collapsed matted condition of fibrils or filaments 58 on the surface 57 clogging the spaces or interstices between the yarns 54, 56 of fabric 52.

In the practice of the present invention, filamentous surfaces 28, 57 of fabrics 22, 52 respectively, can be prepared by means other than the fibrillation method previously mentioned and which is well described in several U.S. Patents, a particularly applicable one being U.S. Pat. No. 4,145,467, K. R. Malik, entitled "Woven Textile," the teachings of which, to the extent they foster and promote better understanding of the present invention, are incorporated herein by reference.

Filamentous surfaced products for use in the present invention can also be prepared using the teachings of U.S. Pat. No. 3,325,323, J. H. Forkner, entitled "Tufting Through A Porous Backing Which Is Subsequently Fused," suitably modified to insure necessary porosity for fluid permeability is maintained in the finished fabric. Of course, the pile forming fiber material mentioned in this patent should be selected, for use in the present invention, to be sufficiently flexible and of low enough denier to accomplish and carry out the hereinbefore stated flow controlling objectives.

Another U.S. Pat. No. 3,293,105, C. R. Koller, entitled "Pile Article" teaches a high pile fabric in which the filamentous surface is prepared by adhesively attaching filamentary material to one surface of a base, or scrim layer fabric. To apply the teachings of this patent to the present invention it will be necessary to select a base fabric which is suitably porous to insure fluid permeates the fabric. Still another method adaptable to produce a suitably filamentous surfaced fabric is described in U.S. Pat. No. 3,085,922, C. R. Koller, entitled "Porous Flexible Self-Supporting Sheet Material And Method Of Making Same". Yet another applicable method is described in U.S. Pat. No. 3,322,607, S. L. Jung, entitled "Lubricated Polypropylene Polyethylene Self-Bonded Non-Woven Carpet Backing". In this patent, a non-woven web is prepared from the laying up of continuous filaments disposed in random, non-parallel fashion. The filaments have a denier of 3 to 15 denier per filament and are made from polymeric substances. These webs are fibrous sheets of fibril or filamentary size, hence can be utilized directly in the present invention if the fibrils are present in sufficient numbers and are long enough. Otherwise a brushing or carding step applied to the sheet must be performed to meet this specification.

The invention has been described in sufficient detail to enable one skilled in the art to practice, make and use the same. Obviously, modifications and alterations of the preferred above-described embodiments will occur to others upon reading and understanding the specification herein presented and such modifications and alterations are included as part of the invention insofar as such come within the scope set forth in the hereinafter following claims.

What is claimed is:

1. An inflatable structure having a folded, deflated condition and an inflated, expanded condition for restraining the movement of a vehicle occupant relative thereto during a collision and having flexible, fluid impermeable walls defining a confinement for a pressurizing fluid introduced interiorly thereof for expanding said structure, a portion of said structure being fluid permeable permitting passage of fluid into and out of said confinement and providing rebound protection for said occupant under restraint when said occupant impacts said structure during the collision of said vehicle, said portion including a fluid permeable fabric having a filamentous surface formed on at least one side, said filamentous surface comprising a plurality of extensile, flexible filaments anchored at one end to said fabric and having free opposite ends adapted to be extended in mutual, substantially parallel relation from said surface, generally perpendicular to said fabric by said fluid permeating said fabric and flowing through said filamentous surface in a direction tending to inflate said structure, passage of said fluid into said structure being relatively unhindered; and, said filaments collapsible onto said fabric by fluid flowing through said filamentous surface and permeating said fabric in a direction tending to deflate said structure, upon impact thereof by said occupant, passage of said fluid in said structure deflating direction being relatively more hindered thereby providing said rebound protection for said vehicle occupant.

2. An inflatable structure as in claim 1 wherein said fluid permeable fabric is a woven sheet at least one of the warp and fill yarns of which are fibrillated to provide said filamentous surface.

3. An inflatable structure as in claim 2 wherein said warp and fill yarns are synthetic polymeric materials selected from polyolefin, polyester, polyamide, polytetrafluoride and mixtures thereof.

4. An inflatable structure as in claim 1 wherein said fluid permeable fabric is a spun bonded, non-woven fabric.

5. An inflatable structure as in claim 4 wherein said fabric is selected from polyolefin, polyester, polytetrafluoride, polyamide polyimidazole and mixtures thereof.

6. An inflatable structure as in claim 1 wherein said fluid permeable fabric is formed from natural materials.

7. An inflatable structure as in claim 6 wherein said natural material is cotton and silk, wool, jute and linen.

8. A flexible restraint for protecting an occupant of a vehicle during a collision, said restraint being inflatable from a folded, collapsed condition to an unfolded, expanded condition for restraining the movement of said occupant relative to said vehicle during the collision and having flexible, fluid impermeable walls defining inner and outer confinements, said inner confinement being contained by said outer confinement in fluid-tight, enclosing relation and adapted to receive fluid from a fluid supply source on said vehicle for inflating said restraint and unfolding said outer confinement, a portion of said outer confinement wall being fluid permeable permitting passage of fluid into and out of said outer confinement for inflating and deflating said outer confinement and providing rebound protection for said occupant under restraint, said fluid permeable portion comprising;

at least one fluid permeable fabric in said outer confinement wall having a filamentous surface on at least one side comprising a plurality of flexible fibrils anchored on one end to said fabric and having free ends adapted to be extended outwardly from said surface in mutual, parallel relation, generally perpendicular thereto by said fluid permeating said fabric and passing through said filamentous surface said fluid passing into said outer confinement relatively unhindered to inflate said outer confinement and, said fibrils being collapsible onto said fabric surface by fluid passing out of said outer confinement into said filamentous surface and through said fabric thereby providing rebound protection for said occupant of said vehicle.

9. A flexible restraint as in claim 8 wherein said inner confinement is tubular and said fluid permeable portion of said outer confinement is annularly disposed about said inner confinement.

10. A flexible restraint as in claim 8 wherein said inner confinement comprises a plurality of tubular members, each of said members being interconnected in sealing communicating relation with at least one other member and with one of said members being connected to said fluid source for inflating said inner confinement.

11. A flexible restraint as in claim 8 wherein said outer confinement in said folded, collapsed condition of said restraint is folded about said inner confinement in said enclosing relation therewith, so that inflation of said inner confinement by said fluid from said source is operative to unfold and expand said outer confinement thereby causing air from said vehicle interior to flow into said outer confinement through said fluid permeable portion of said outer confinement wall and inflate said outer confinement.

12. Fluid flow control means for an inflatable structure having flexible, fluid impermeable walls defining a confinement of the type used as a protective cushion for restraining an occupant of a vehicle during a collision, said means permitting relatively unrestricted fluid flow into said confinement to inflate said structure and restrain the movement of said occupant relative to said vehicle, and permitting relatively more restricted fluid flow out of said confinement to deflate said structure and provide rebound protection for said occupant being restrained by said cushion, said fluid flow control means comprising;

a fluid porous fabric in said structure wall having a filamentous surface on at least one side, said filamentous surface comprising a plurality of flexible, extendible fibrils anchored at one end to said fabric and having free opposite ends outwardly extending from said fabric in mutual, substantially parallel relation by the fluid passing through said fabric into said confinement, said fluid flowing relatively unrestricted to inflate said structure and restrain said occupant, said fibrils adapted to collapse onto said fabric by fluid passing out of said confinement, said fluid flowing relatively more restricted through said collapsed fibrils in said filamentous surface and through said porous fabric to deflate said structure and provide rebound protection for said occupant.

13. Fluid flow control means according to claim 12 wherein said fabric is a woven textile product, the warp and fill yarn weave configuration of which is an open pattern to provide said fluid porosity to said fabric.

14. Fluid flow control means according to claim 13 wherein said yarns are synthetic plastic selected from the group consisting of polyester, polyamide, polytetrafluoride, polyolefin, polyimidazole and mixtures thereof.

15. Fluid flow control means according to claim 13 wherein at least one of said warp and fill yarns are fibrillated to provide said fibrils of said filamentous surface of said fabric.

16. Fluid flow control means according to claim 12 wherein said fabric is a non-woven perforated textile product.

17. Fluid flow control means according to claim 12 wherein said fabric is a synthetic plastic selected from the group consisting of polyolefin, polyester, polytetrafluoride, polyamide, polyimidazole and mixtures thereof.

18. Fluid flow control means according to claim 12 wherein said filamentous surface is formed by fibrillating a said fabric.

19. Aspirator means for an inflatable vehicle occupant restraint system of the type using an inflatable cushion having a folded, collapsed condition and an unfolded, expanded condition and having flexible, fluid impermeable walls defining inner and outer confinements, said inner confinement being contained in said outer confinement in fluid-tight, enclosing relation and adapted to receive fluid from a fluid pressure supply on said vehicle for inflating said cushion from said folded, collapsed condition to said unfolded, expanded condition, said outer confinement adapted to be expanded by inflation of said inner confinement and aspiration of air from the vehicle interior to provide rebound protection for said vehicle occupant, said aspirator means comprising;

a portion of said wall defining said outer confinement being a fluid permeable fabric having a filamentous surface on at least one side comprising a plurality of flexible filamentary fibrils anchored at one end to said fabric and having free ends adapted to be extended into said outer confinement by said aspirated air flowing thereinto while permeating said fabric and flowing through said filamentous surface relatively unrestrictedly, said filamentary fibrils collapsible onto said fabric surface by passage of said aspirated air out of said outer confinement through said filamentous surface and said permeable fabric to provide said rebound protection for said occupant impacting said cushion upon collision of said vehicle.

20. Aspirator means for use in an inflatable vehicle occupant restraint system of the type comprising, in combination, a source of pressurized fluid, inflatable cushion means having a folded, collapsed condition and an expanded, inflated condition in which movement of said occupant relative to said vehicle is restrained, and fluid impermeable walls defining at least one compartment communicating with said fluid pressure source for inflating said cushion means and at least one ambient atmosphere inflatable confinement having a folded, collapsed condition, an expanded, inflated condition providing rebound protection for said occupant upon impact thereon by said occupant, and flexible fluid impermeable walls substantially enclosing said pressure inflated cushion means in fluid-tight relation therewith, said aspirator means being a fluid permeable panel incorporated in a wall of said confinement permitting relatively unrestricted passage of ambient air into and expanding said confinement and restraining said occupant during a collision of said vehicle and relatively restricted passage of said ambient air out of said confinement providing rebound protection for said occupant from impact on said confinements, said panel comprising;

a fluid permeable fabric having a filamentous surface on at least one side comprising a plurality of flexible filaments anchored to said fabric surface and adapted to be extended perpendicularly outwardly therefrom and into said confinement by the force of flow of said ambient air passing into said confinement; and, said filaments adapted to collapse onto said fabric surface by force of said ambient air flowing out of said confinement through said collapsed filaments and said fabric, said collapsed filaments providing said restriction to flow of said ambient air passing out of said confinement providing said rebound protection for said occupant from impact on said confinement.

21. Aspirator means for use in an inflatable vehicle occupant restraint system of the type comprising, in combination, a source of pressurized fluid, first inflatable cushion means having a folded, collapsed condition and an expanded, inflated condition and fluid impermeable walls defining at least one compartment communicating with said fluid pressure source for inflating said first cushion means, and at least one additional inflatable cushion means having a folded, collapsed condition and an expanded, inflated condition and flexible, fluid impermeable walls substantially enclosing said first cushion means in fluid-tight relation and wherein said aspirating means is incorporated in a wall of said additional cushion means for inflating said additional cushion means by aspiration of ambient air in said vehicle, said ambient air passing into said additional cushion means relatively unrestrictedly under aspiration forces generated by expansion of said additional cushion means when said first cushion means is inflated, said aspiration means comprising;

a fluid permeable fabric having a filamentous surface on one side characterized by a plurality of flexible, extensile fibrils having free ends projectable from said fabric surface in mutual, substantially parallel relation by the force of the aspirating fluid permeating said fabric and passing through said filamentous surface into said additional cushion means in said relatively unrestricted passage thereinto and said fibrils collapsible onto said filamentous surface providing a relatively more restricted passage of said fluid out of said additional cushion means and rebound protection for said occupant upon impact of said occupant against said cushion means during a collision of said vehicle.

* * * * *